(12) United States Patent
Karas et al.

(10) Patent No.: US 8,381,123 B2
(45) Date of Patent: Feb. 19, 2013

(54) POSITIONING AND REALIZING OF VIRTUALIZED VISIBLE CONTENT WITHIN A VIEWPORT

(75) Inventors: Benjamin Karas, Seattle, WA (US); Fabrice A. Debry, Bellevue, WA (US); Jason Alan Christensen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 12/163,920

(22) Filed: Jun. 27, 2008

(65) Prior Publication Data

US 2009/0327952 A1    Dec. 31, 2009

(51) Int. Cl.
*G06F 3/048*    (2006.01)
(52) U.S. Cl. ........................ 715/786; 715/973
(58) Field of Classification Search .................. 715/786, 715/973
See application file for complete search history.

(56) References Cited

U.S. PATENT DOCUMENTS

| | | | | |
|---|---|---|---|---|
| 4,375,638 A * | 3/1983 | O'Keefe et al. | ............... | 345/685 |
| 4,744,046 A * | 5/1988 | Foster | ............... | 345/28 |
| 5,333,247 A * | 7/1994 | Gest et al. | ............... | 345/672 |
| 5,796,401 A | 8/1998 | Winer | | |
| 5,838,295 A * | 11/1998 | Aoyama | ............... | 715/784 |
| 5,877,761 A * | 3/1999 | Shoji et al. | ............... | 715/784 |
| 5,960,431 A * | 9/1999 | Choy | ............... | 1/1 |
| 6,208,343 B1 * | 3/2001 | Roth | ............... | 715/786 |
| 6,626,958 B1 | 9/2003 | McCauley | | |
| 7,103,369 B2 * | 9/2006 | Sato et al. | ............... | 455/456.3 |
| 7,120,868 B2 | 10/2006 | Salesin | | |
| 7,246,311 B2 | 7/2007 | Bargeron | | |
| 7,738,688 B2 * | 6/2010 | Eichhorn et al. | ............... | 382/133 |
| 2003/0080995 A1 | 5/2003 | Tenenbaum et al. | | |
| 2004/0119753 A1 * | 6/2004 | Zencke | ............... | 345/786 |
| 2006/0031760 A1 | 2/2006 | Jacobs | | |
| 2006/0200752 A1 | 9/2006 | Sellers et al. | | |
| 2006/0200764 A1 * | 9/2006 | Sellers et al. | ............... | 715/526 |
| 2006/0224952 A1 | 10/2006 | Lin | | |
| 2006/0277481 A1 * | 12/2006 | Forstall et al. | ............... | 715/764 |
| 2007/0079236 A1 | 4/2007 | Schrier | | |
| 2007/0168859 A1 | 7/2007 | Fortes | | |

OTHER PUBLICATIONS

David F. Sklar, et al., "An Introduction to Windows Presentation Foundation," Sep. 2005, 22 pages, Microsoft Corporation, http://msdn2.microsoft.com/en-us/library/aa480192.aspx.

Charles Jacobs, et al., "Adaptive Document Layout via Manifold Content," 4 pages, http://www.csc.liv.ac.uk/~wda2003/Papers/Section_II/Paper_6.pdf.

* cited by examiner

*Primary Examiner* — Tuyetlien Tran
*Assistant Examiner* — Amy M Levy
(74) *Attorney, Agent, or Firm* — Shook, Hardy & Bacon L.L.P.

(57) ABSTRACT

A method and medium are provided for presenting virtualized visible content within a viewport in a user interface. An anchor is received that represents a point on a line of virtualized visible content and a target value is received that represents a location in a viewport of a user interface. The anchor and target values can be received from user input devices or by analyzing the position of a scroll thumb relative to a scroll trough in the user interface. A first line of virtualized visible content that corresponds to the anchor value is realized by loading the line into memory from another source. The line is then positioned in the viewport based on the target value. Additional lines surrounding the first line are realized until the viewport is full. Lines that are not visible in the viewport can be unrealized, thus conserving computing resources.

8 Claims, 5 Drawing Sheets

POSITIONING AND REALIZING OF VIRTUALIZED VISIBLE CONTENT WITHIN A VIEWPORT

BACKGROUND

In windowed computing environments, users are often presented with more visual information than the user interface can display at any given time. The portion of the user interface in which the visual information is presented can be referred to as a viewport. In instances where the space required to present the visual information exceeds the size of the viewport, the location of the viewport can be manipulated to present different portions of the visual information. A scrollbar can be used to effectuate this manipulation. A scroll bar is comprised of a scroll thumb located in a scroll trough. The position of the scroll thumb within the scroll trough indicates the portion of the visual content presented in the viewport relative to the entire visual content available for presentment in the viewport.

SUMMARY

Embodiments of the present invention relate to methods and computer-storage media for presenting virtualized visible content within a viewport in a user interface. In a first aspect, the position of the top of a scroll thumb relative the length of a corresponding scroll trough is determined. An anchor and target value is calculated based on the position of the scroll thumb relative to the corresponding scroll trough. A portion of virtualized visible content to realize is determined based on the anchor value. A part of the realized portion of virtualized visible content is presented within the viewport based on the anchor and target.

In a second aspect, computer-storage media with instructions embodied thereon for performing a method of scrolling a line to a specified location within a viewport in a user interface are provided. A specified location is received that includes corresponding anchor and target values. One or more lines of virtualized visible content are realized based on the anchor and target values and the size of the viewport. The proper position for a scroll thumb within a scroll trough is determined and the scroll thumb is presented at that position accordingly.

In a third aspect, computer-storage media with instructions embodied thereon for performing a method of positioning one or more lines of virtualized visible content within a viewport in a user interface are provided. An anchor and target value are received and a first line of virtualized visible content is realized corresponding to the anchor value. The first line is then positioned in the viewport based on the target value. One or more lines surrounding the first line are then realized, and one or more lines that are not visible in the viewport are unrealized.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to methods and computer-readable media with computer-executable instructions embodied thereon for presenting virtualized visible content within a viewport of a user interface. Lines of virtualized visible content are positioned within the viewport based on an anchor value which defines a point on a line and a target value that defines a point in the viewport that that the anchor is to be aligned with. The anchor and target values can be received from a user input device or an application. Lines of virtualized visible content can be realized and unrealized based on their position with regards to the viewport. Lines in or near the viewport can be realized by loading them into memory from another source. Lines outside of the viewport can be unrealized by being discarded from memory, thereby preserving computing resources.

Having briefly described an overview of embodiments of the present invention, an exemplary operating environment suitable for use in implementing embodiments of the present invention is described below.

Figure 1:
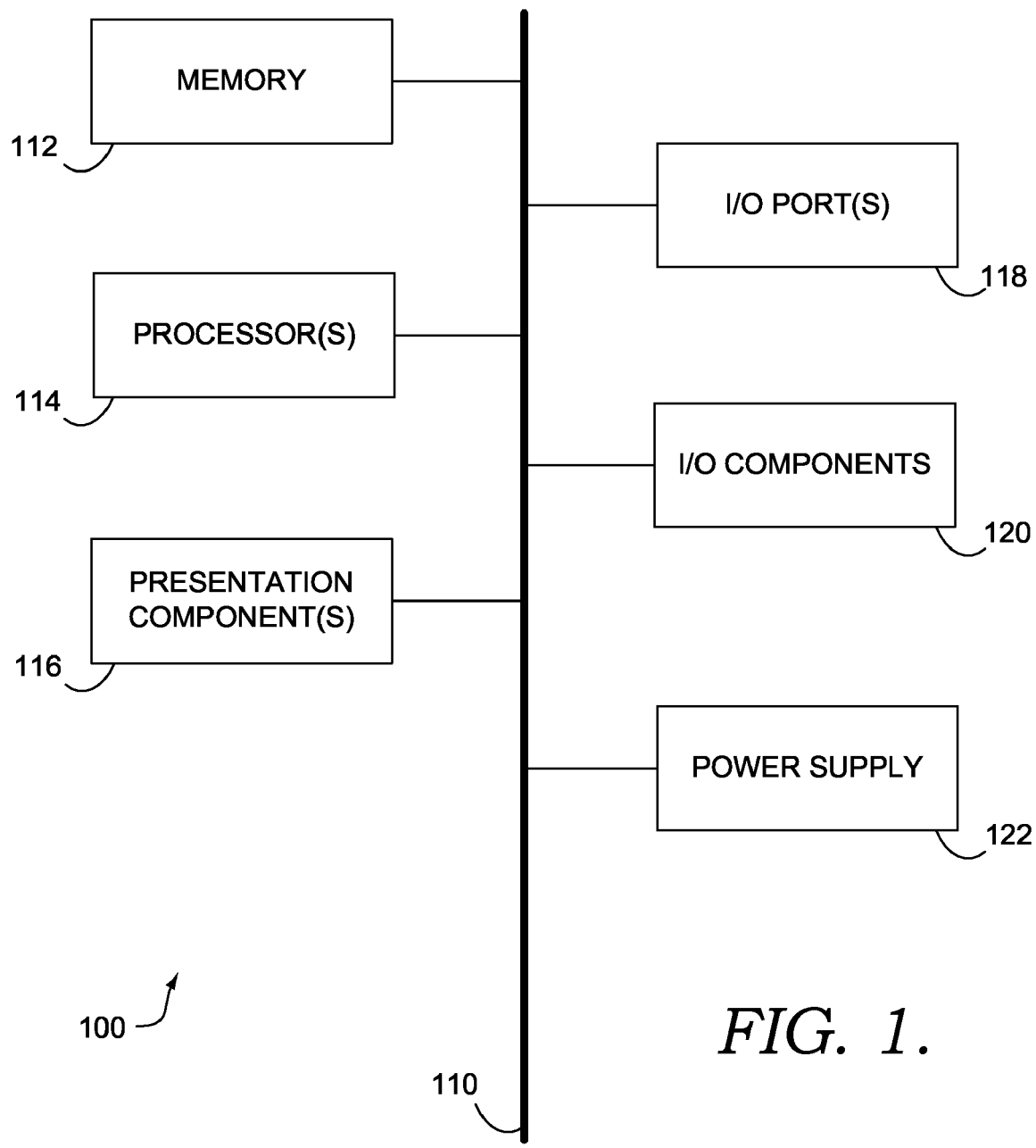
FIG. 1 is a block diagram of a computing system environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the illustrated computing environment be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other hand-held device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty-computing devices, and the like. Embodiments of the present invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disk drives, and the like. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game advertisement, satellite dish, scanner, printer, wireless device, and the like.

Figure 2:
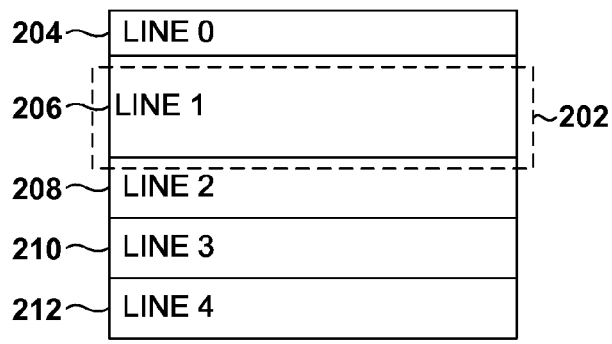
FIG. 2 is a diagram illustrating the relationship of lines of virtualized visible content and a viewport in a user interface in accordance with an embodiment of the invention.

Turning now to FIG. 2, a diagram is presented that illustrates the relationship of lines of virtualized visible content and a viewport in a user interface in accordance with an embodiment of the invention. Viewport 202 is depicted as a dashed-line in FIG. 2 and represents the boundary of visible content that is visible in the user interface of a computing device. Lines 204, 210 and 212 lie outside the boundaries of the viewport 202 and are therefore not presented in the user interface. Portions of lines 206 and 208 lie within the boundaries of the viewport 202 are presented in the user interface.

Lines 204, 206, 208, 210 and 212 represent lines of virtualized content. Lines 204, 210 and 212 lie outside the viewport 202 and are therefore not visible. Lines 206 and 208 lie within the viewport 202 and are therefore visible. As depicted in FIG. 2, the lines can be of varying heights, which may only be determinable upon realization of the lines. Alternatively, the height of the lines may be known.

The content can be any type of information that can be presented visually in a user interface of a computing device. As the content is virtualized, it is only loaded into memory of the computing device when needed. The memory can be a form of computer-storage media. The process of loading visible content in memory is referred to herein as realization, and likewise the process of unloading visible content from memory is referred to as unrealization. The visible content need not be transferred back to the source it was originally retrieved from during realization. Instead, it can simply be discarded from memory, for instance, by permitting the portion of memory that it had previously occupied to be overwritten with other data. By realizing virtualized visible content only when it is needed, or likely to be needed, for presentment in the viewport of a user interface, significant computing resources can be conserved.

While specific mention has been made that the loading of visible content into memory constitutes realization, the visible content can also be transferred from one type of memory to another type of memory upon realization. For instance, when the content is realized it can be transferred from one type of computer-storage media with a relatively slow access time, such as a hard disk drive, to another type of computer-storage media with a faster access time, such as random access memory (RAM). In addition, the content could be loaded into a form of computer-storage media by transferring it over a network, such as the internet or another local area network (LAN) or wide area network (WAN) upon realization.

Although not depicted in FIG. 2, input devices for a computing typically permit a user of said device to change the orientation of the viewport 202 with respect to the lines 204, 206, 208, 210 and 212. By changing the orientation of the viewport 202, different lines 204, 206, 208, 210 and 212, or portions thereof, are presented in the viewport 202. The changing of the orientation of the viewport is commonly referred to as "scrolling".

Users can effectuate the change in orientation of the viewport through numerous user input devices, such as a pointing device, a standard mouse, a touch pad, or a keyboard. Other forms of user input devices can be implemented as well to change the orientation of the viewport 202 with respect to the lines 204, 206, 208, 210 and 212. In addition, the change in orientation of the viewport 202 can occur as a result of one or more commands issued or actions taken by an application.

Figure 3:
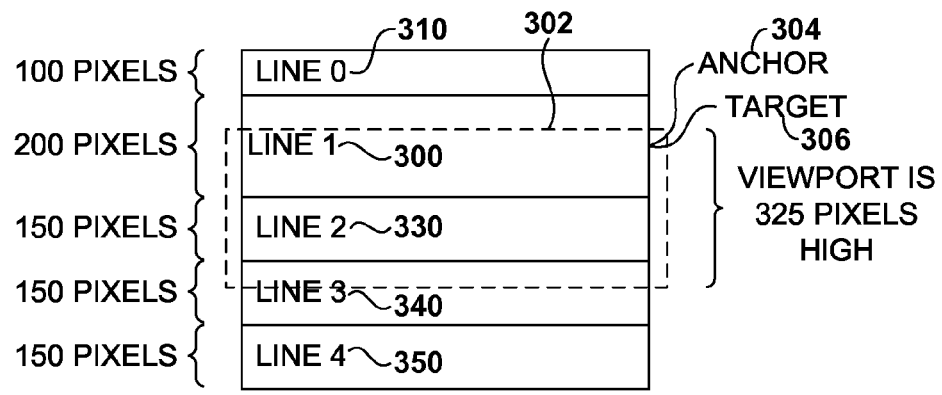
FIG. 3 is a block diagram illustrating the relationship of lines of virtualized visible content and a viewport in a user interface in accordance with an embodiment of the invention.

With reference now to FIG. 3, a block diagram illustrating the relationship of lines of virtualized visible content and viewport in a user interface is presented in accordance with an embodiment of the invention. The dimensions depicted in FIG. 3 are exemplary in nature and are provided to aid in explanation only. In no way should the exemplary dimensions be considered as limiting the scope of the disclosure herein.

As depicted in FIG. 3, lines 310, 320, 330, 340 and 350 can be of varying heights based on the content contained therein. Viewport 302 is depicted as a dashed-line in FIG. 3 and represents the boundary of visible content that is visible in the user interface of a computing device. Lines 310 and 350 lie outside the boundaries of the viewport 302 and are therefore not presented in the user interface. Portions of lines 320 and 340 and all of line 330 lie within the boundaries of the viewport 302 and are presented in the user interface.

Anchor 304 defines a position in a line of virtualized visible content that coincides with a point in the viewport 302. This point in the viewport 302 is referred to as a target 306. As depicted in FIG. 3, viewport 302 measures 325 pixels in height. In the present example, the target 306 is set at approximately 50 pixels from the top of the viewport 302. The anchor 304 is set at half way between the uppermost and lowermost boundary of line 320, with a value of 1.5 (e.g., one and a half lines down), accordingly. The anchor 304 and target 306 values provide the ability to precisely define a position of a line of virtualized visible content within the viewport 302. The anchor 304 and target 306 can be adjusted by a user of the computing device on which the viewport 302 is presented, or by an application.

Figure 4:
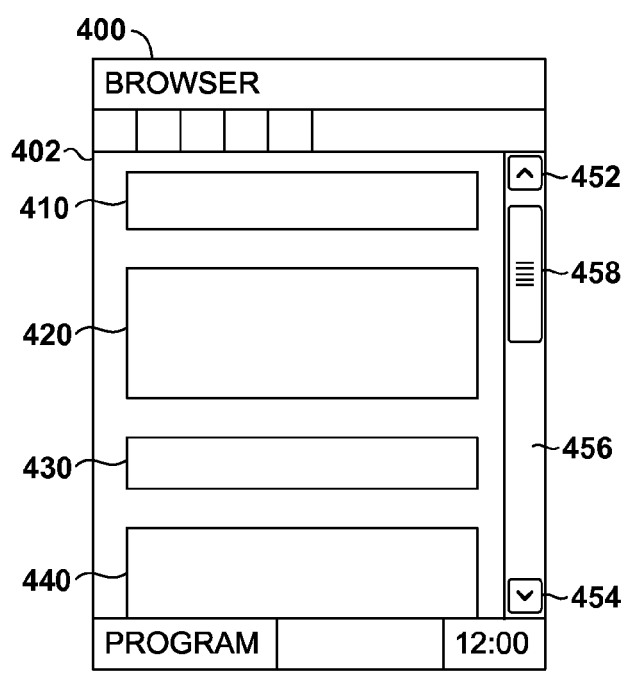
FIG. 4 is a diagram illustrating an exemplary user interface in accordance with an embodiment of the invention.

With reference now to FIG. 4, a diagram illustrating an exemplary user interface in accordance with an embodiment of the invention is presented. User interface 400 presents to a user of a computing device lines of virtualized visible content 410, 420, 430 and 440 through viewport 402. A user can adjust the orientation, i.e. scroll, of the viewport 402 through selecting scroll arrow buttons 452 and 454 with a user input device, or by inputting commands to the computing device. These commands can be input through the use of a user input device, such as a mouse, touchpad, pointing device, or keyboard. As the orientation of the viewport 402 changes with respect to the lines of virtualized visible content 410, 420, 430 and 440, the position of a scroll thumb 458 in the scroll trough 456 changes as well. The position of the scroll thumb 458 in the scroll trough 456 provides a representation of the orientation of the viewport 402 with respect to all available lines of virtualized visible content. In addition to the methods for changing the orientation of the viewport 402 described above, a user can also select the scroll thumb 458 with a user input device and drag the scroll thumb to a desired position in the scroll trough 456.

Figure 5:
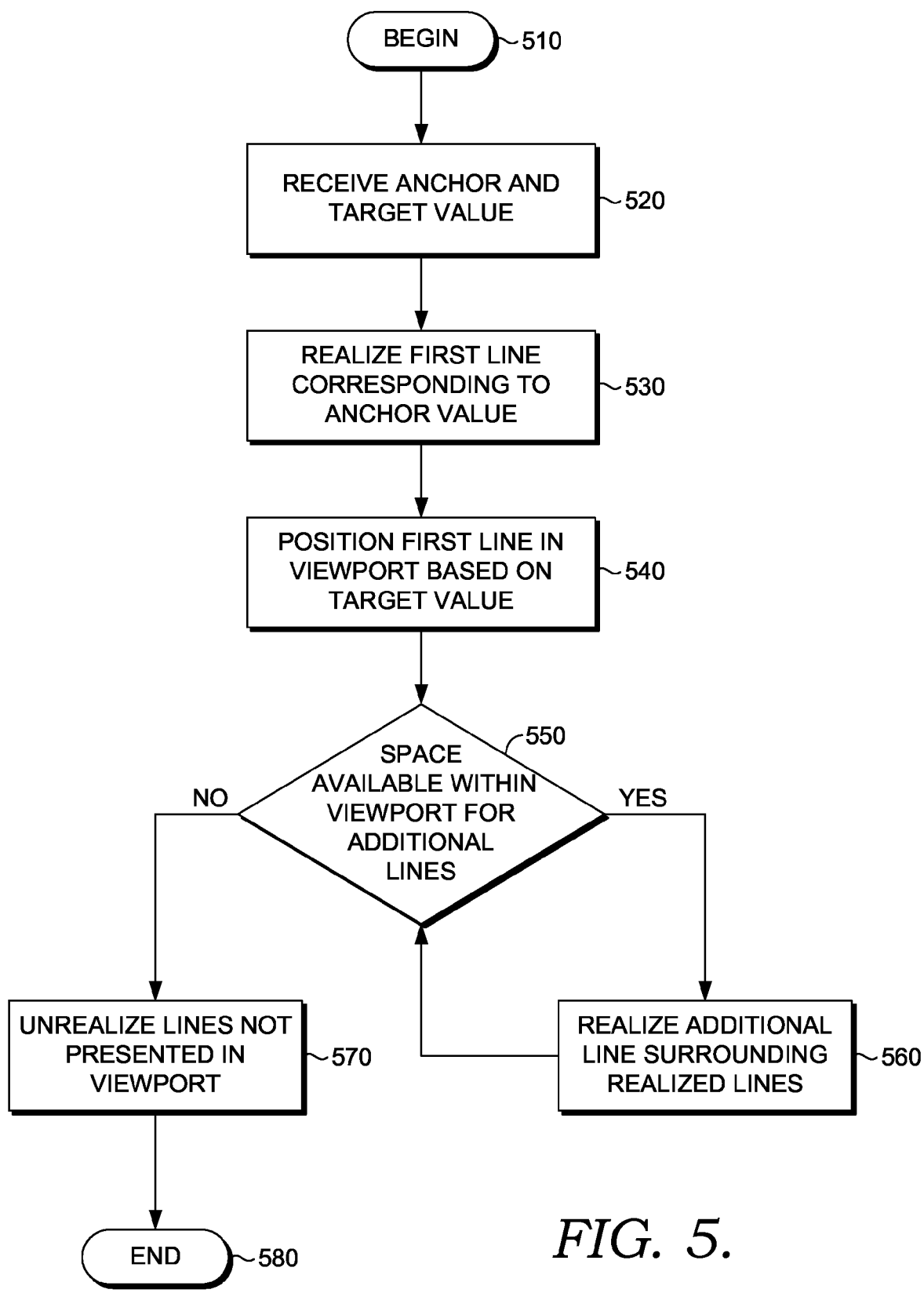
FIG. 5 is a flow diagram illustrating a process of realizing one or more lines of virtualized visible content in a viewport, in accordance with an embodiment of the invention.

Turning now to FIG. 5, a flow diagram illustrating a method of realizing one or more lines of virtualized visible content is in a viewport is presented in accordance with an embodiment of the invention. The method begins in block 510 where an anchor and target value are received in block 520. The anchor and target values can be received from user input devices, such as a pointing device, standard mouse, touchpad, or keyboard. In addition, the anchor and target values can also be computed from the position of the scroll thumb within the scroll trough or determined via other algorithms in an application The anchor value can take the form of a number, or fractional variant thereof, of a line of virtualized visible content. For instance, if there are 20 lines of virtualized visible content available for presentment, each line could be sequentially numbered, starting at 0 and ending at 20. A valid anchor value would then be any number, fractional variants included, between 0 and 20, such as 1.5 (which would represent the middle of line 1). The target value can be the form of a number or other identifier that identifies a specific position in the viewport. For instance if the viewport measures 400 pixels from top to bottom, a valid target value would be any numerical value between 0 and 400. Any manner of numbering can be used for defining positions within the viewport. In the remainder of the specification, it will be assumed that pixels in the viewport are numbered sequentially from the top of the viewport, starting with '0'. For illustrative purposes of discussion for the remainder of FIG. 5, an anchor value of 1.5 and a target value of 200 will be referenced.

A first line of virtualized visible content corresponding or including the anchor value is realized in block 530. In the example provided above in relation to block 520 where the anchor value is 1.5, the line designated by the number '1' would be realized in block 530, as it includes the anchor value.

In other instances, the content can span multiple lines, thereby resulting in the realization of multiples lines simultaneously. In that instance, the method proceeds as described below in relation to block 540.

In block 540 the first line is positioned in the viewport based on the target value received in block 540. In the above example, the line realized in block 530 would be positioned at a position in the viewport corresponding to 200 pixels down from the top of the viewport. As the anchor value is 1.5, the first line would be positioned so that a point equidistant from the top and bottom of the first line would coincide with the target value.

In decision block 550, a determination is made of whether there is additional space within the viewport to present additional lines of virtualized visible content within the viewport. This determination can be made by the computing device or any application that can analyze the information being presented in the user interface to determine if there is either space above or below the first line being presented in the viewport.

If there is additional space available, the method proceeds to block 560 where an additional line of virtualized visible content surrounding the first line is realized. If there is space above the first line, an additional line can be realized accordingly. In the example above, the line corresponding to '0' can be realized. A line below the first line could be realized as well, such as the line corresponding to '2'. In situations where there is only space in the viewport above or below the first line, the additional line can be rendered accordingly. However, in situations where there is both space above and below the first line, both a line above and below can be realized in block 560. In addition, multiple lines could be realized simultaneously, or nearly so, by estimating the number of lines required to fill the space and realizing the lines accordingly.

The method then returns to block 550 where the determination is again made of whether there is additional space within the viewport to present additional lines of virtualized visible content. As before, if there is additional space available, the method proceeds to block 560 accordingly where an additional line of virtualized visible content is realized. The method then returns back to block 550 to determine if there is additional space present. This cycle then continues until the viewport is full of realized lines of virtualized visible content.

Additionally, other criteria can be used in determining which lines to realize. For instance, additional lines outside of but surrounding the viewport can be realized to aid in the seamless scrolling of the viewport. In this manner, lines are in effect 'pre-loaded' into memory ahead of their anticipated use. In the above example, assume that lines 0-5 are visible in the viewport. Additional lines can be realized into memory, such as lines 6-8, so that when a user scrolls the viewport to a position where lines 6-8 would be presented, the lines do not need to be realized into memory on the fly. This process can be continuous so that when a user scrolls the viewport to a new position, one or more lines that are not currently visible in the viewport can be realized. In other instances, the process could be performed on a schedule determined by the application, such as delaying the preloading of lines by a set time period. Different criteria can be applied to determine how many additional lines, if any, to realize outside of the viewport.

Returning back to FIG. 5, if it is determined in block 550 that there is not additional space available, the method proceeds to block 570 where lines of virtualized visible content that are not being presented in the viewport are unrealized. As discussed above, lines of virtualized visible content may not be immediately unrealized. An application may choose to keep lines of virtualized content in memory for various reasons, such as if that content is expecting user input despite being positioned outside the viewport, or if another component desires to communicate with the content. These are just a few of multiple reasons for which content may not be immediately unrealized when not presented in the viewport. The method then ends at block 580.

Figure 6:
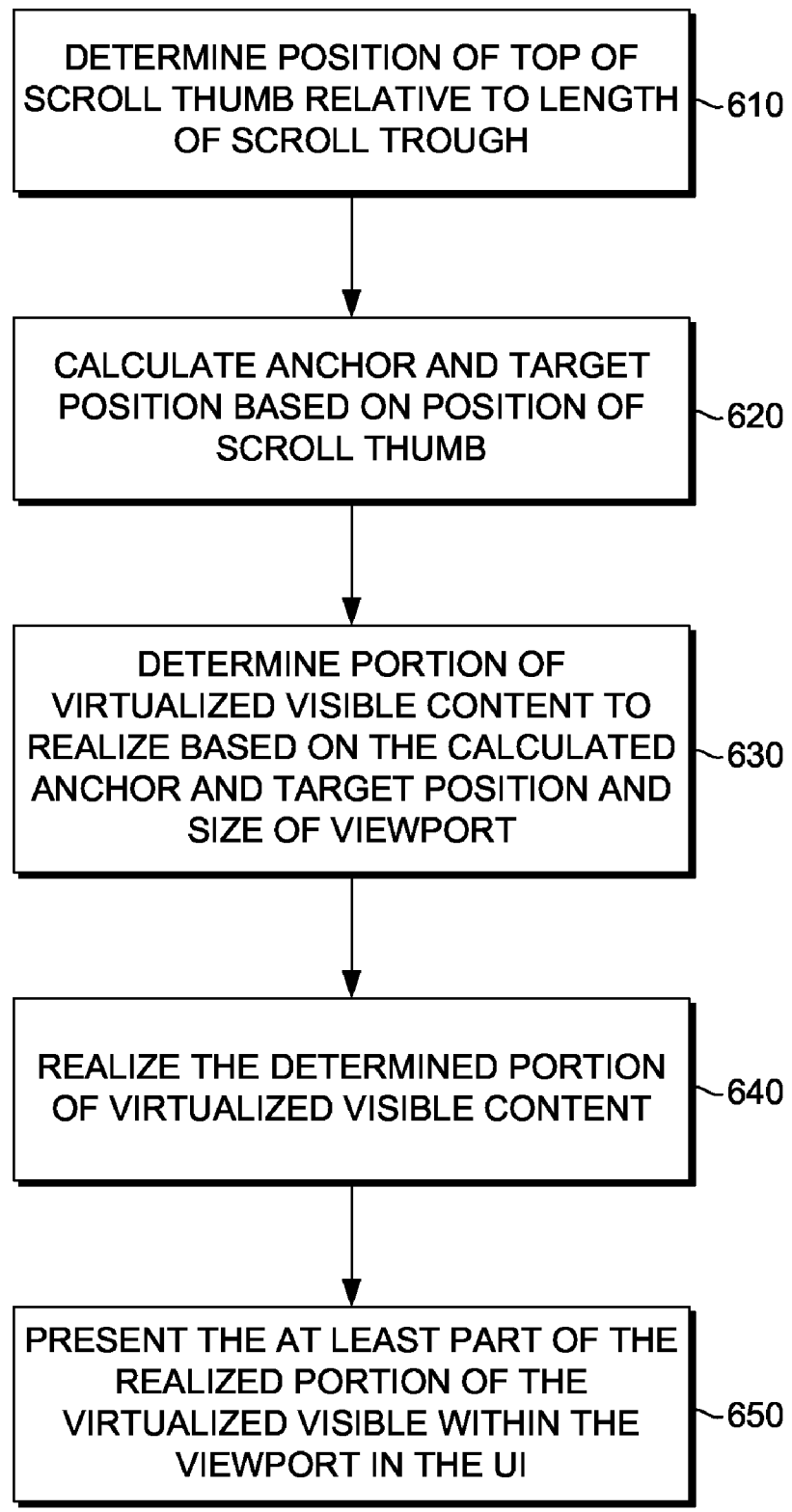
FIG. 6 is a flow diagram illustrating a method of presenting virtualized visible content within a viewport in a user interface in accordance with an embodiment of the invention.

With reference now to FIG. 6, a flow diagram illustrating a method of presenting virtualized visible content within a viewport in a user interface is presented in accordance with an embodiment of the invention. In block 610, the position of the top of a scroll thumb relative to the length of a scroll trough is determined. The position of the scroll thumb in the scroll trough represents the position of the viewport relative to the entire virtualized visible that is available for presentment in the viewport. For instance, if lines 5-10 of virtualized visible content are presented in the viewport, and there are a total of lines 1-15, the scroll thumb would be positioned approximately equidistant from the ends of the scroll trough.

At block 620 the anchor and target value is calculated based on the position of the scroll thumb. As indicated previously, the anchor value represents a point on a line of virtualized visible content. The target value represents a point in the viewport that the anchor value is aligned therewith. The distance of the center of the scroll thumb from the top, or bottom, of the scroll trough can be calculated. In other instances, the distance from the top of the scroll thumb can be calculated and used instead. A ratio of that distance to the total length of the scroll trough not occupied by the scroll thumb can be determined. The underlying intent is to compare where the scroll thumb is located versus the amount of movement available to the scroll thumb within the scroll trough.

This ratio can then be multiplied by the total number of lines available for presentation to determine an anchor value. The target value can then be determined by analyzing the point at which it coincides with in the viewport. For instance, if the anchor value is determined to be '2.5', and it lines up, or coincides with, a pixel located 200 pixels from the top of the viewport, the target value is '200'.

While specific example has been made to methods that can be implemented in block 620 to calculate that anchor and target position based on the position of the scroll thumb, other methods may be used as well. For example, the application can set the target value to '0' pixels from the top of the viewport, and adjust the anchor value depending on the position of the scroll thumb. This can be accomplished by determining the ratio of the distance of the distance from the scroll thumb to the top of the scroll trough, and then multiplying that ratio by the total number of lines of virtualized content. In other instances, this can be accomplished by first establishing an estimate of the number of lines of virtualized content that would be required to fill the viewport. This can be done using historical data on the height of the lines, using heuristics, or by comparing the number of lines of virtualized content previously visible in the viewport to the total number of lines of virtualized content. The application can update the estimate using a heuristic such as when the scroll thumb approaches the bottom of the viewport, a set period of time passes, or the user performs an action, etc. The estimated number of lines of virtualized content required to fill the viewport can be subtracted from the total number of lines of virtualized content. The result of this subtraction operation can be multiplied by the distance of the scroll thumb to the top of the scroll trough, and resulting product can be used as an anchor value In instances where the scroll thumb position within the scroll trough is not known, the position can be determined by applying essentially the same method described in relation to block 620 in the opposite direction. For example, the total number of lines available for representation in the viewport can be determined. Given a known anchor value, a ratio can be calculated of the anchor value to the total number of lines available. This ratio can then be multiplied by the total length of the scroll trough to determine the mid-point of the scroll thumb. This scenario assumes that the target value is equidistant between the top and bottom of the viewport.

In instances where the target value is not equidistant between the top and bottom of the viewport, different calculations can be conducted. The number of lines, or fractional portions thereof, visible in the viewport are calculated, and then divided by two, resulting in a first variable. The number of lines lying above the viewport and the total number of lines available are determined as well, resulting in a second and third variable, accordingly. The first and second variables are added together, creating a fourth variable. A ratio is then calculated of the fourth variable to the third variable. This ratio can then be multiplied by the total length of the scroll trough to determine the mid-point of the scroll thumb In block 630, a determination is made of a portion of virtualized visible content to realize based on the calculated anchor and target value and size of a viewport. A first line of virtualized visible content that corresponds to the anchor value would first be realized. For instance, if the anchor value is determined to be 2.5, the first line would be '2' line of virtualized visible content.

In block 640, the determined portion of virtualized visible content is realized. The determined portion can be realized by loading the content into a form of memory, or transferring it into memory from another source.

At block 650, at least a portion of the virtualized visible content is presented with the viewport in the user interface. The virtualized visible content can be presented by displaying it in the viewport of the user interface. Additionally, if the orientation of the viewport is manipulated, i.e. scrolled, portions of the virtualized visible content that are no longer presented in the viewport can be unrealized by unloading or discarding them from memory.

Figure 7:
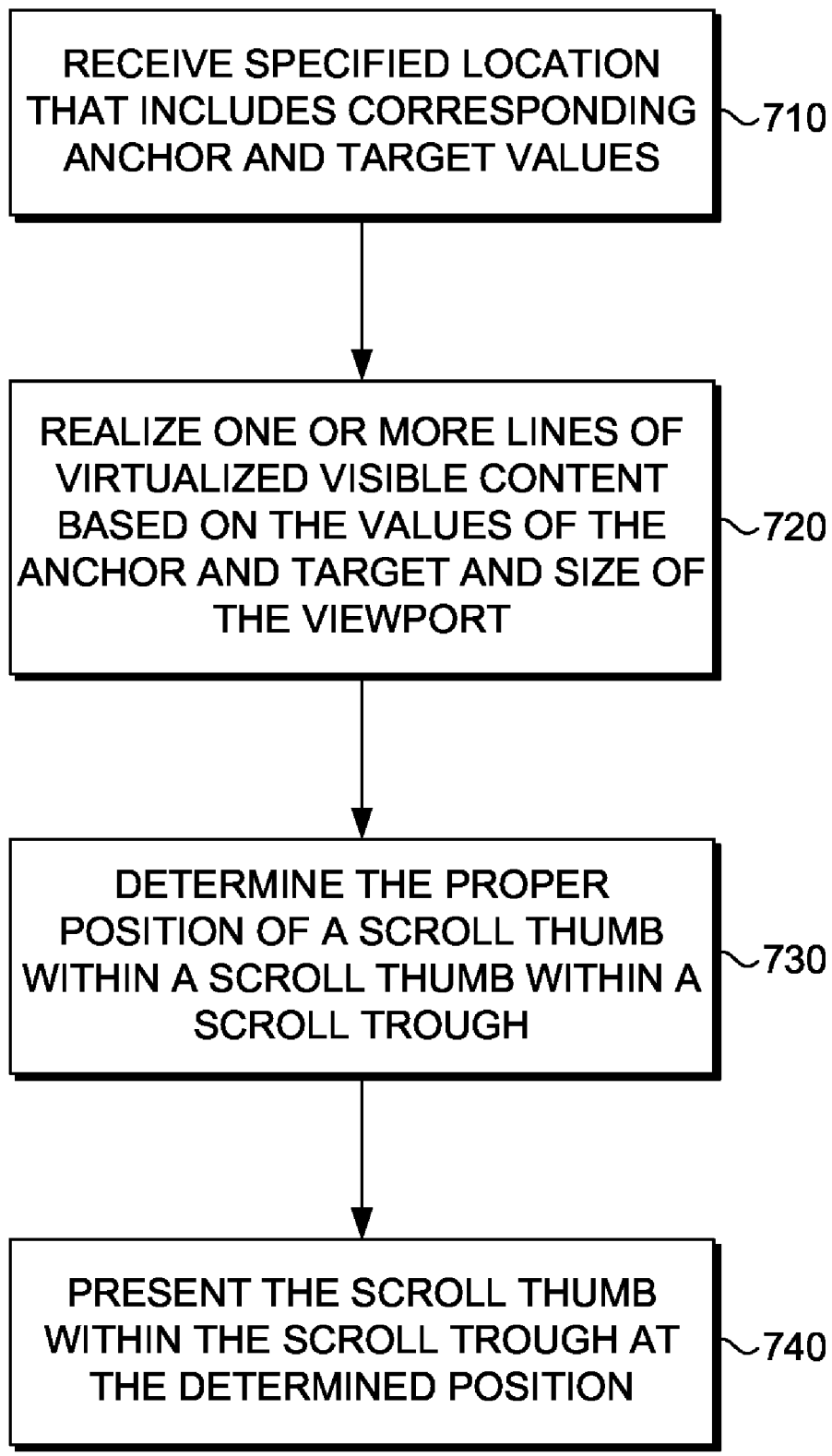
FIG. 7 is a flow diagram illustrating a method for scrolling a line of virtualized visible content to a specified location within a viewport of a user interface, according to one embodiment of the invention.

With reference now to FIG. 7, a flow diagram is presented for a method of scrolling a line of virtualized visible content to a specified location within a viewport in a user interface. In block 710, a specified location is received that includes a corresponding anchor and target value. The specified location can be received from a user input device, or from an application. The user input device can be, for instance, a pointing device, a computer mouse or keyboard, or a touchpad. As indicated previously, the anchor value defines a point on a line of virtualized visible content and the target value defines a point in the viewport of the user interface that anchor is aligned with.

At block 720, one or more lines of virtualized visible content are realized based on the values of the anchor and target and size of the viewport. Realizing lines of virtualized visible content comprises loading the lines into memory from another source. The other source can be a different type of memory, or a different storage location, such as the internet or other network. A portion of a first line corresponding to the anchor value can be realized first. One or more additional lines of virtualized visible content located above or below the first line can then be realized until the viewport is filled with lines of virtualized visible content, in the same manner as described in relation to FIG. 5, above.

At block 730, the proper position of scroll thumb in a scroll trough is determined. To determine the proper position of the scroll thumb, the total number of lines of virtualized visible content available for presentation is determined. This can be an estimation carried out by the computing device, or the content can be analyzed to determine an exact count of the number of lines available. The ratio of the anchor value to the number of lines of virtualized visible content is then calculated. The proper position of the scroll thumb is then determined by multiplying the calculated ratio to the total length of the scroll trough.

The size of the scroll thumb can be ascertained as well. A determination is made of the total number of lines of virtualized visible content available for presentation in the viewport through the methods described above and number of lines of virtualized visible content currently being presented in the viewport is determined. The ratio of these two values is then calculated. This ratio is then multiplied by the total length of the scroll trough to determine the size of the scroll thumb. For example, if two lines are currently being presented in the viewport and a total of ten lines are available for presentation, the ratio would be 0.2. Assuming that the scroll trough was 200 units in length, the scroll thumb would be 40 units in length.

In block 740, the scroll thumb is presented within the scroll trough at the determined position.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. One or more computer-storage media with computer-executable instructions embodied thereon for performing a method of positioning one or more lines of virtualized visible content within a viewport in a user interface, the method comprising:
   receiving an anchor value and target value;
   realizing a first line corresponding to the anchor value;
   positioning the first line in the viewport based on the target value;
   realizing one or more lines surrounding the first line, wherein at least a portion of the one or more lines surrounding the first line are not visible within the viewport and the portion of one or more lines surrounding the first line that are not visible within the viewport but are anticipated to be visible within the viewport are realized after a predetermined period of time has elapsed;
   unrealizing one or more lines that are not visible in the viewport;
   receiving an indication that an orientation of the viewport has changed;
   upon receiving an indication that the orientation of the viewport has changed, identifying an updated anchor value and an updated target value, wherein an updated anchor value is identified by:
      identifying a center of a scroll thumb;
      identifying a distance of the center of the scroll thumb to a top of a scroll trough;
      identifying a ratio of the distance of the center of the scroll thumb to a top of a scroll trough to a total length of the scroll trough not occupied by the scroll thumb; and
      multiplying the ratio by a total number of lines available for presentation;
   realizing an updated line corresponding to the anchor value; and
   positioning the updated line in the viewport based on an updated target value.

2. The media of claim 1, wherein the anchor value defines a point on a line of virtualized visible content.

3. The media of claim 1, wherein the target value defines a point in the viewport of the user interface.

4. The media of claim 1, wherein realizing a first line corresponding to the anchor value comprises loading a line of virtualized visible content into memory that includes the anchor value.

5. The media of claim 1, wherein unrealizing one or more lines that are not visible in the viewport comprises unloading the one or more lines that are not visible in the viewport from memory.

6. The media of claim 1, wherein realizing one or more lines surrounding the first line further comprises:
   determining the number of additional surrounding lines that can be presented in the viewport based on the available space in the viewport after the first line is presented in the viewport; and
   realizing the determined number of additional surrounding lines.

7. The media of claim 6, wherein realizing the determined number of additional surrounding lines comprises loading the determined number of additional surrounding lines into memory.

8. A method of presenting virtualized visible content within a viewport in a user interface, the method comprising:
   determining the position of the top of a scroll thumb relative to the length of a corresponding scroll trough, wherein the scroll thumb represents the position of the viewport relative to the entire virtualized visible content and is located within the scroll trough in the user interface;
   calculating an anchor and target value based on the position of the scroll thumb, wherein the anchor value defines a point on a line in the virtualized visible content and the target value represents a point in the viewport that the anchor value is aligned with;
   determining a portion of virtualized visible content to realize based on the calculated anchor value, target value and size of the viewport;
   realizing the determined portion of the virtualized visible content based on the calculated anchor value, target value, and size of the viewport, wherein realizing includes loading into memory the determined portion of the virtualized visible content, and wherein at least a portion of content that is not within the portion of virtualized visible content within the viewport and that is anticipated to be within the viewport is realized after a predetermined period of time has elapsed;
   presenting at least part of the realized portion of virtualized visible content within the viewport in the user interface based on the calculated anchor value and target value;
   receiving an indication that an orientation of the viewport has changed;
   upon receiving an indication that the orientation of the viewport has changed, identifying an updated anchor value and an updated target value;
   realizing an updated line corresponding to the updated anchor value; and
   positioning the updated line in the viewport based on an updated target value.

* * * * *